US011439479B1

(12) United States Patent
Garfinkel

(10) Patent No.: US 11,439,479 B1
(45) Date of Patent: Sep. 13, 2022

(54) METHOD AND DEVICE FOR TREATMENT OF PERI-IMPLANTITIS

(71) Applicant: Leonard Garfinkel, New York, NY (US)

(72) Inventor: Leonard Garfinkel, New York, NY (US)

( * ) Notice: Subject to any disclaimer, the term of this patent is extended or adjusted under 35 U.S.C. 154(b) by 0 days.

(21) Appl. No.: 17/199,248

(22) Filed: Mar. 11, 2021

Related U.S. Application Data

(63) Continuation-in-part of application No. 16/165,263, filed on Oct. 19, 2018, now abandoned.

(51) Int. Cl.
*A61C 3/03* (2006.01)
*A61C 1/07* (2006.01)
*A61C 1/00* (2006.01)
*A61C 8/00* (2006.01)

(52) U.S. Cl.
CPC .............. *A61C 1/07* (2013.01); *A61C 1/0061* (2013.01); *A61C 3/03* (2013.01); *A61C 8/0089* (2013.01)

(58) Field of Classification Search
CPC ................................ A61C 3/03; A61C 8/0089
See application file for complete search history.

(56) References Cited

U.S. PATENT DOCUMENTS

| 3,241,239 A * | 3/1966 | Ellis .......................... A61C 1/07 433/120 |
| 4,731,019 A * | 3/1988 | Martin ...................... A61C 1/07 433/119 |
| 5,836,765 A * | 11/1998 | Hickok ................... A61C 3/166 433/119 |
| 2013/0171582 A1* | 7/2013 | Nishikibe .......... A61C 17/0202 433/86 |
| 2016/0081764 A1 | 3/2016 | Yasushi et al. |

* cited by examiner

*Primary Examiner* — Heidi M Eide
(74) *Attorney, Agent, or Firm* — Malin Haley DiMaggio & Bowen, P.A.

(57) ABSTRACT

An ultrasonic tip, attachable to an ultrasonic handheld instrument for vibrational energy, and method for treating peri-implantitis by removing a thin layer of the surface of the contaminated metal implant base that is exposed from the loss of osseo-integration due to bacteriological biofilms. The ultrasonic tip includes a narrow wire shaft body having at its distal end a concave abrasive diamond-coated tapered grinder plate with a front grinding surface, tapered in thickness from top to bottom, that can be manually pressed against an exposed implant base vertical cylindrical diseased surface while the grinder plate is vibrated ultrasonically to remove a thin layer of the titanium alloy metal implant base. The ultrasonic tip narrow wire shaft body has three bends to avoid the crown when manually positioning the grinding surface of the grinder plate to ensure manipulation the grinding surface by the periodontist. A detoxicant liquid is introduced during cleaning to enhance removal of diseased material by vibration of the liquid to penetrate microstructural surface areas of the implant base.

3 Claims, 9 Drawing Sheets

METHOD AND DEVICE FOR TREATMENT OF PERI-IMPLANTITIS

RELATED APPLICATIONS

This application is a Continuation-In-Part of U.S. patent application Ser. No. 16/165,263 entitled "Method and Device For Treatment of Peri-implantitis" filed Oct. 19, 2018.

BACKGROUND OF THE INVENTION

1. Field of the Invention

This invention relates generally to a method and device for the treatment of peri-implantitis comprising an ultrasonic tip having a diamond-coated grinder plate, of tapered thickness, for reaching a diseased exposed implant base surface in narrow jawbone areas. The ultrasonic tip is removably attachable to an ultrasonic instrument to apply high frequency ultrasonic vibrations to the tapered grinder plate. Specifically, the ultrasonic tip includes a narrow shaft with strategic bends that, when attached to the hand-held ultrasonic instrument, provide a specific physical position of the grinder plate, and particularly the front grinder surface, relative to the ultrasonic hand-held instrument to provide ergonomically enhanced manually positioning of the tapered, diamond-coated grinder plate in parallel contact with a diseased implant base surface without interference from the implant crown. By manual grinding, the diamond-coated grinder plate can remove a thin layer of the diseased, roughened titanium implant base surface. The ultrasonic tip vibrations can also be used to activate a liquid bacterial detoxificant, placed around the implant base diseased areas, for additional removal of diseased materials on the microstructure roughened implant base surface.

2. Description of Related Art

Dental implants to replace human teeth have been used for several years. A dental implant has a peg-like metal base or fixture that is externally threaded to allow the metal base to be screwed into a the jawbone. With osseo-integration, the implant metal base becomes firmly attached to the jawbone. The cylindrical implant metal base has been constructed with a roughened (micro-structurally) exterior surface portion, increasing surface area, (along with possible screw threads) to provide and enhance integration.

Over time, dental implants have experienced a loss of osseo-integration on the upper exterior surface portion of the metal base because of bacterial biofilms that become embedded in the external roughened microstructure of the implant surface, including the screw threads. The contaminated implant metal base and loss of osseo-integration result in the production of exposed metal (and possible threaded areas) forming defective areas where the jawbone has separated, exposing the roughened diseased area of the implant base, and if there are threads, some of the screw threads. Peri-implant diseases are inflammatory conditions affecting the soft and hard gum tissues around dental implants resulting from a build-up of bacteria on the base of the implant below the gumline. The exposed metal base of the implant is treated using the present invention to reestablish a healthy implant and gum with re-osseo-integration by removal of bacterial biofilms.

Because the diseased dental implant metal base surface is a roughened area having numerous, extremely small microstructural pits and valleys that become filled with destructive bacteria or their by-products, the prior art has shown several different methods and devices for cleaning the implant metal base's roughened surface area and threads to remove bacterial biofilms and other mineral deposits. But care was taken in the prior art to clean the implant roughened surface with a titanium tip, and only remove foreign debris, and not remove a thin layer of titanium or damage or in any way alter the titanium surface of the implant base.

U.S. Patent Application Publication US 2016/0081764 published Mar. 24, 2016 entitled "Ultrasonic Tip For Ultrasonic Instrument and Method of Dental Treatment with said Ultrasonic Tip" describes a method and device to debride and clean the surface of a dental implant metal base to remove bacteria and other elements for the treatment of peri-implantitis. Because of the very small microscopic roughened areas on the implant surface involved and, especially in the very small grooves between the screw threads, the ability to debride and clean those structures requires the manipulation of a plurality of different-sized instruments in very small spaces to remove bacteria biofilms while not disturbing the roughened implant surface. The reason for the prior art insistence on a titanium ultrasonic tip is to maintain the structural integrity of the implant metal base titanium surface. In contrast, Applicant's invention intentionally removes a thin layer of the diseased implant base titanium surface for improved bacterial removal on roughened surfaces.

The present invention provides an improved ultrasonic tip with a tapered grinder plate and tip disposed at the distal end of a narrow shaft having strategic bends as a geometrical arrangement for ergonomically positioning the grinder plate to provide a different and more successful treatment of the implant base roughened surface for removal of all bacterial biofilms and other undesirable surface contaminants, even from microstructure roughened areas on the implant metal base surface, by grinded removal of a thin layer of the implant metal base, and ultrasonic vibration of a liquid detoxicant applied thereto, to enable possible re-osseo-integration of the treated area of the implant metal base surface.

SUMMARY OF THE INVENTION

A method and device comprising an ultrasonic tip having a tapered grinder plate for ultrasonically grinding and removing a thin layer of exposed diseased exterior surface of an implant metal base for treatment. The surface grinding is achieved by using an ultrasonic tip affixed to the distal end of a narrow shaft with strategic geometric bends. The ultrasonic tip includes a diamond-coated grinder plate defining a tapered thickness. The proximal end of the ultrasonic tip end is removably attached to an ultrasonic vibration instrument that includes a hand-held housing.

The very small tapered grinder plate (6 mm in length in some embodiments) has an elongated vertical length and a slightly concave, vertical, side to side (horizontally) curved front diamond coated grinding surface. The tapered diamond-coated grinder plate is connected on its upper backside to the ultrasonic tip shaft body at a strategic angle. Most importantly, the substantially rectangular-shaped grinder plate is vertically tapered in thickness, having a larger thickness at the top edge and a thinner thickness along the bottom edge, to allow maximum grinder plate surface area contact within a jaw bone defect on the implant diseased surface by the operator, manually, during the implant surface debriding cleaning procedure.

The conventional ultrasonic vibration instrument has a piezo-electric frequency generator and is handheld for vibrating the ultrasonic tip and grinder plate. The diamond-coated grinder plate is part of the ultrasonic tip body distal end that can be manually positioned to engage the exterior diseased surface, in a parallel and vertically disposed orientation, of the exposed implant metal base, by holding the ultrasonic instrument between the thumb and fingers. The grinder plate surface is vibrated ultrasonically at frequencies between 20,000 Hz and 40,000 Hz, or other desirable frequencies.

The ultrasonically vibrated diamond-coated tapered grinder plate, pressed manually parallel vertically against the implant metal base vertical surface, grinds and removes a thin layer of the outer exterior surface of the diseased dental implant wherein the titanium metal base is contaminated, leaving a reduced fresh exterior implant surface, free of bacteria or any other disease-causing material, such as bacterial biofilms and their byproducts. The ultrasonically vibrated diamond-coated grinder plate can also remove contaminated screw thread tips, if present, in the exposed diseased area that are also impregnated with bacteria biofilms and their byproducts.

During the implant base grinding treatment, a liquid bacterial detoxicant can be introduced that is also activated by the ultrasonic instrument vibrations to allow the detoxicant liquid to penetrate microstructural roughened areas of the contaminated implant base surface to further enhance the debridement and removal of diseased materials from the implant base surface. A liquid such as citric acid can be introduced into the patient's gum area defect having the exposed implant base being treated with the tapered grinder plate.

Most cylindrical metal implant bases that include screw threads are constructed of titanium alloys. A diamond-coated slightly concave grinder plate surface area may serve as the ultrasonic device distal tip. The vertically tapered, in thickness, grinder plate, having a diamond-coated concave surface, is manually placed, parallel vertically, in direct contact with the diseased implant, and particularly the contaminated metal base surface (with manual surface pressure and ultrasonic tip vibrations from the hand-held ultrasonic instrument) and removes a thin layer of the titanium alloy containing the roughened implant exterior surface along with contaminants, such as bacteria biofilm and its byproducts.

The diseased area of the implant surface exposure is often in a very small, wedge-shaped cavity of gum (jawbone and tissue) and implant exposed surface area, is difficult to access for grinding. There is a bottom line in the wedge-shaped cavity defect where the jaw bone is connected by integration to the implant surface. The vertically tapered grinding plate thickness, from top to bottom of the grinding plate, allows for maximum depth penetration within the defect and contact of the grinder plate surface onto the exposed contaminated implant surface for parallel contact grinding into the diseased jaw bone opening defect, surrounding the exposed contaminated implant base surface for maximum grinder plate surface access to the lower exposed implant base surface for maximum debriding and cleaning of the contaminated roughened exposed surface area of the implant base.

The abrasive diamond-coated grinder surface, under manual pressure and up and down vertical movement typically, along with ultrasonic vibrations, and direct concave surface area contact, removes a thin surface layer that produces a fresh exterior surface of the implant metal base that is substantially free of diseased microstructure roughened surface area, even with screw tip thread removal, and any bacteria, bacterial biofilms or any other deleterious materials that would lessen or prevent re-osseo-integration. Cleaning action is also enhanced in roughened microscopic areas and threaded tip grooves by ultrasonic vibration activation of a detoxicant liquid placed in the jawbone diseased defect area and onto microstructure roughened areas for liquid removal of bacteria in the microstructural roughened areas during the liquid activation by the ultrasonic vibration procedure.

Also important to the invention is the ultrasonic tip narrow wire shaft body (constructed primarily from a bent wire) and its configuration from proximal end to distal end, having the tapered grinder plate, and its use of three important wire bends that position the tapered grinding plate and the diamond-coated grinder plate concave front grinding surface, somewhat parallel at a distinct position below and away from the ultrasonic instrument cylindrical housing longitudinal axis vertical plane, when the ultrasonic instrument is held manually horizontally, representing positions to be employed in use. The strategic position front and below distance and angle between the hand-held ultrasonic housing plane and the tapered forward facing grinder plate allow the operator the ability to maneuver the tapered grinder plate below the diseased exposed implant crown, affixed on top of the implant, to prevent interference in the grinding procedure, to keep the concave grinder surface parallel to the cylindrical implant contaminated surface of the diseased implant. Three segments of ultrasonic tip shaft body are separated by first, second and third bends, each bend at a strategic angle that positions the grinder surface outwardly away from and below the ultrasonic instrument cylindrical housing when held with the longitudinal axis of the housing horizontal and with the grinder plate surface substantially facing forward, away and vertically parallel to an anticipated diseased implant having an exposed cylindrical contaminated surface, either front or back, cheek side or tongue side.

The invention is manufactured to provide two mirror image configurations, so the operator can manually control the ultrasonic instrument and tip and grind about a first 180 degrees around an exposed diseased cylindrical surface with one configuration and about a second 180 degrees around the exposed cylindrical surface with the second configuration. Thus with two mirror image configurations, the operator can manually control the ultrasonic instrument to grind 360 degrees around a diseased implant cylindrical surface, such as tongue side and cheek side. The mirror image configuration differences geometrically begin at the end of the ultrasonic tip shaft wire body first segment end axis, with the second and third ultrasonic tip shaft body segments angled as mirror images, in mirror image angles, and equal first, second and third segment lengths, terminating in the grinder plate front surface oriented to face away from the ultrasonic instrument housing when the ultrasonic tip is connected to the ultrasonic instrument.

The method of the invention allows a trained operator, such as periodontist, to treat a patient having peri-implantitis with a manually held ultrasonic vibrating instrument that attaches to an ultrasonic tip having a narrow wire shaft body with a tapered diamond-coated grinder plate at its distal end. The operator manually grasps the cylindrical housing of the ultrasonic instrument with the thumb and fingers, which allows the operator to manually position the diamond-coated tapered grinder plate vertically parallel to an exposed diseased vertical cylindrical metal implant base. Using the grinder plate with its concave diamond-coated surface, the operator can remove a very thin surface layer of a titanium containing implant base, thereby also removing bacterial biofilms. The operator must position the grinder plate, which is quite small (6 mm in vertical length) into a diseased jawbone defect cavity in the patient's jawbone tissue that has separated from the upper exterior portion of a titanium implant base. Grinding can also remove threaded tips of the implant base threads for improved removal of bacterial biofilms. The tapered grinder plate is suited for manual positioning downwardly in the jawbone defect, which itself is often wedge-shaped, to allow deep penetration of the grinder plate front surface to the lowest levels of exposed surface area of the implant base for thorough cleaning and grinding as much contaminated surface area of the diseased implant as possible. With the invention having two ultrasonic tips, each with a grinder plate, arranged in mirror images, the operator can exchange ultrasonic tips (and grinder plates), so that the operator can conveniently grind the tongue side of the diseased implant base of approximately 180° surface area and then the mirror image ultrasonic tip can grind the cheek side surface area of the diseased implant base, also of 180° surface area. The strategic shaft segments and particular angular bends at first, second, and third shaft body segments allow the operator positioning a grinder plate into a jawbone defect to more easily to avoid a bulbous crown above the implant base, preventing interference. The grinder plate front surface for grinding is substantially parallel to the vertical plane of the ultrasonic instrument housing when horizontal and also located below the instrument housing when horizontal in a predetermined angle.

Also during the treatment, the operator introduces a liquid detoxicant into the jawbone defect containing the exposed implant base contaminated surface. The ultrasonic vibrations of the tapered grinder plate, when it contacts the detoxicant in the area of the implant base surface, greatly enhances the action the liquid detoxicant and its removal effect on the roughened metal surface of the implant base, which has microscopic-roughened areas to increase surface area in contact with the jawbone which often get contaminated and is difficult to remove. Applicant has found that grinding plate vibrations can greatly enhance cleaning used in conjunction with a liquid detoxicant around the surface area of the implant base during treatment.

It is an object of the invention to provide a method and a device to treat a dental implant experiencing peri-implantitis by removing the microstructure roughened surface of the implant metal base, including screw thread tips, if present, that have been contaminated by bacteria or other by-products, by grinding and removing a thin layer of diseased implant base surface with an ultrasonic diamond-coated tapered grinder plate that can reach deeper in the bone defect cavity permitted by the tapered shape of the grinder plate for more complete cleaning of the diseased areas near the bottom of the exposed implant base area. It is the direct intent of this invention to remove the implant contaminated surface of a diseased implant as opposed to preserving the implant surface using a nonabrasive soft titanium-based tip.

Another object of the invention is to provide an ultrasonic tip, for an ultrasonic vibrating instrument, for grinding a diseased exposed implant surface using a ultrasonic tip narrow wire shaft having three bends that are angled to strategically position the grinder surface front grinding surface away and below the ultrasonic instrument cylindrical housing when oriented horizontally by hand and substantially vertically parallel to the horizontal instrument housing to prevent interference between the implant crown and the grinder plate during the cleaning process.

It is another object of this invention to enhance the debridement process during ultrasonic diamond-coated grinding by also introducing and activating a liquid detoxicant in the jaw bone defect with ultrasonic vibrations for micro-structure roughened area removal of bacteria by a liquid detoxicant vibrating on the implant base surface.

DETAILED DESCRIPTION OF THE INVENTION

Figure 1A:
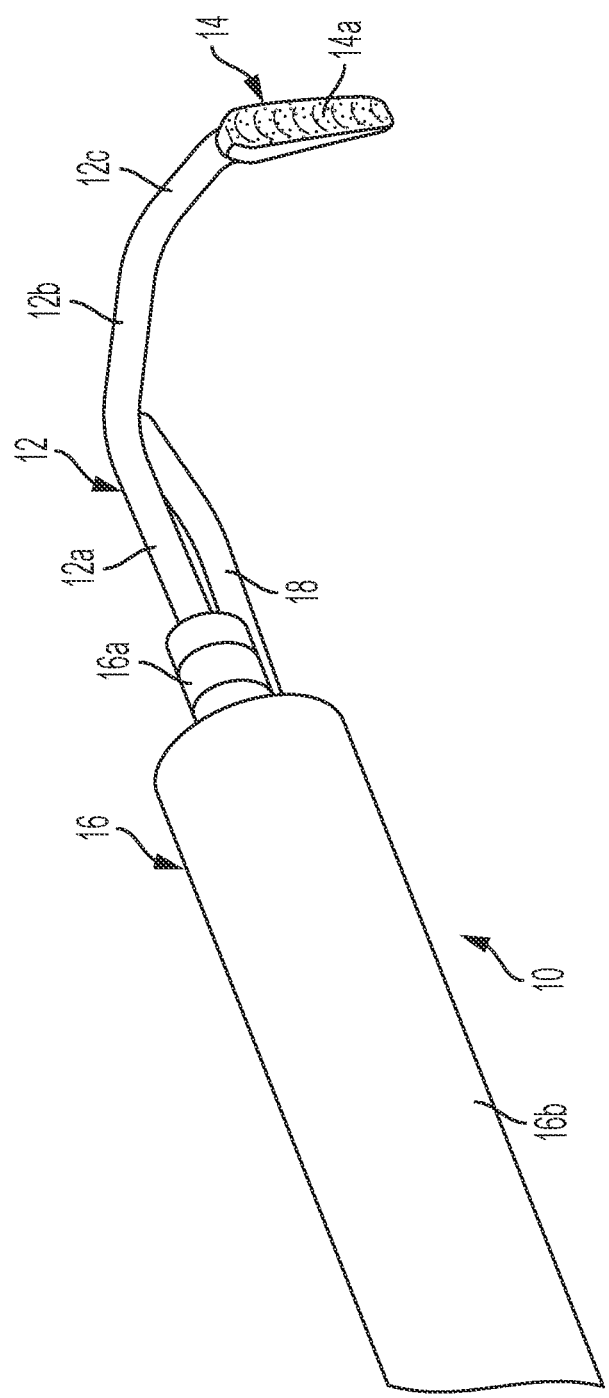
FIG. 1A shows a perspective view of the invention that includes the hand-held housing of an ultrasonic instrument, and an ultrasonic tip with a narrow wire bent shaft and front view of a tapered diamond-coated grinder plate and its front grinding surface.
Figure 1B:
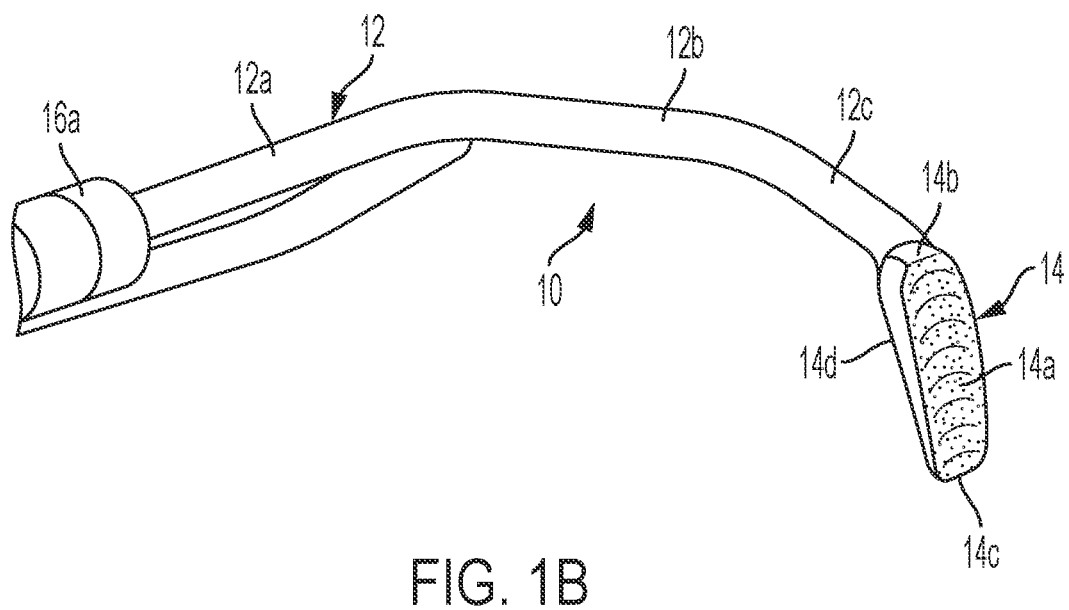
FIG. 1B is a partial front perspective view of the invention that shows an ultrasonic tip having a narrow wire shaft body and important bends for positioning the tip mounted diamond-coated tapered grinder plate (front view) front grinding surface away, below and substantially horizontal relative to the ultrasonic instrument housing, manually positioned horizontally to instrument housing during grinding, to avoid interference between the grinder front surface and the crown.

Referring now to the drawings, FIG. 1A and FIG. 1B, the invention 10 is shown comprising an ultrasonic tip, generally referenced as 12, attached to ultrasonic instrument, generally referenced as 16. The ultrasonic tip 12 supports and connects at its distal end, to a diamond-coated tapered grinder plate, generally referenced as 14. Grinder plate 14 defines a generally concave grinder plate surface 14a, which defines a concavity defined about a vertical axis when grinder plate 14 is disposed vertically to facilitate mating grinding engagement with a vertically disposed implant base as more fully discussed herein.

The ultrasonic tip 12 is connected at its proximal end at tip shaft body section 12a to ultrasonic instrument 16 distal end connector 16a. The ultrasonic instrument 16 has an outer cylindrical housing 16b that serves as a manual grasping handle for an operator to be used to position the grinder plate 14 while the grinder plate 14 is being ultrasonically vibrated by a conventional electro-mechanical component (not shown) inside ultrasonic instrument housing 16b as is known in the art of ultrasonic vibration mechanisms.

Figure 6:
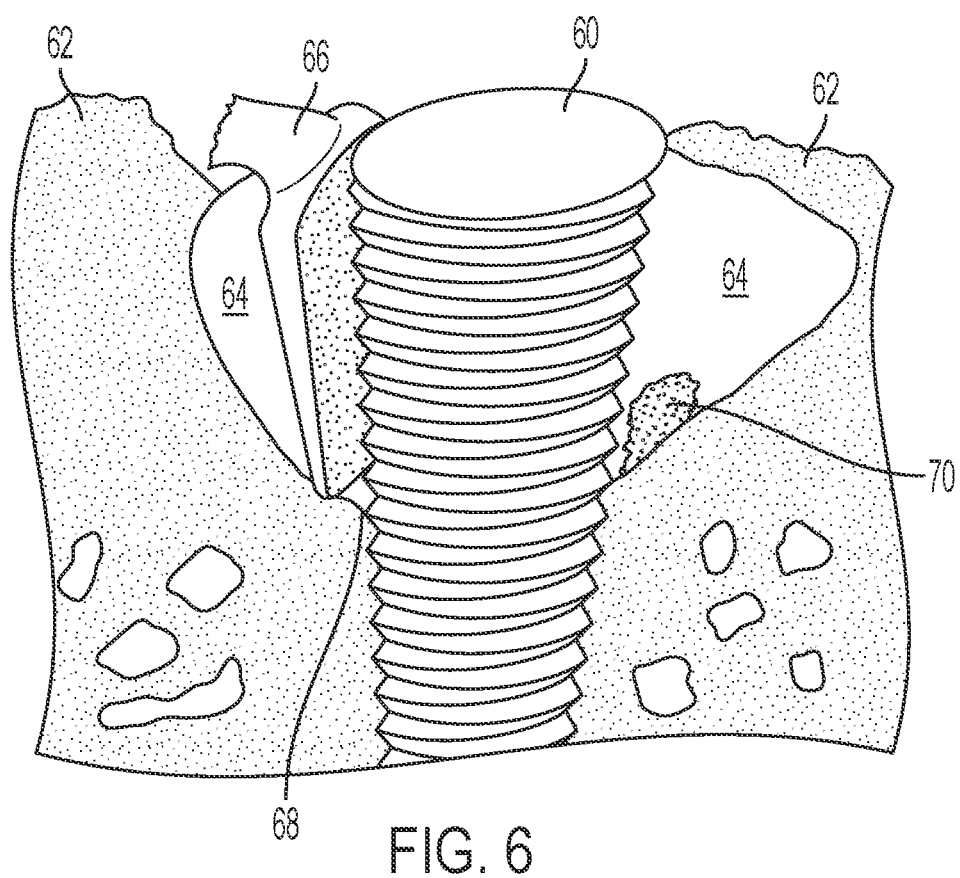
FIG. 6 shows a schematic diagram that represents a tapered grinder plate accessing an exposed cylindrical implant base threaded surface within a jawbone loss surrounding cavity somewhat tapered defect.
Figure 7:
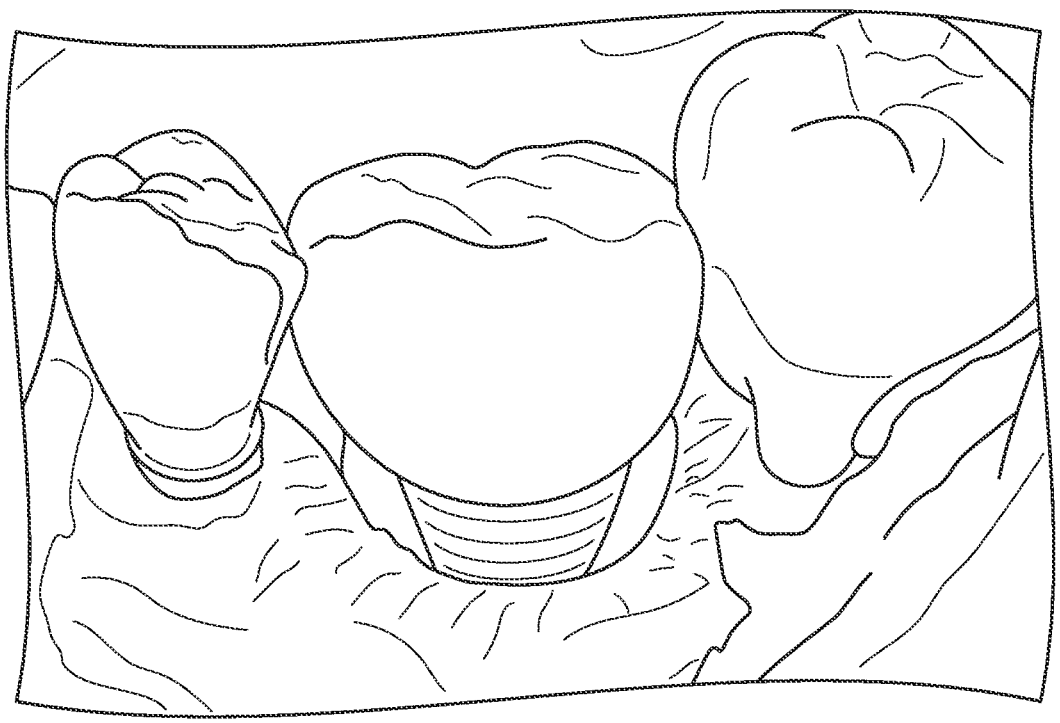
FIG. 7 is a drawing of a photograph of a human lower jawbone with a center implant and diseased implant base suffering loss of jawbone, a crown, and the center implant base jaw bone defect cavity exposing a portion of the middle diseased implant base.

Applicant has found that accessing a diseased jawbone defect having an exposed contaminated vertical cylindrical implant base surface to be cleaned in a diseased jawbone defect in the patient's jawbone, especially in the deepest and lower portion of the jawbone defect, between bone and implant base surface, is difficult because the small bone/implant exposed surface forms a wedge-shaped cavity defect as illustrated in FIGS. 6 and 7. Applicant has determined that the tapered grinder plate which is vertically narrower from top to bottom permits deeper penetration of the grinder plate surface 14a for cleaning and grinding of the cylindrical implant exposed surface. The tapered grinder plate 14 is discussed in greater detail below.

The ultrasonic tip 12 has three tip shaft narrow wire body segments 12a, 12b, and 12c, each narrow wire body segment distinguished by one or two strategic bends, that together are an important aspect of the invention. The tapered grinder plate 14 is also disposed at an important third bend angle to the third narrow wire shaft body segment 12c (65 degrees relative to the third segment longitudinal axis in one embodiment) to permit forward facing parallel contact during grinding of the concave front surface 14a and a cylindrical contaminated implant base surface manually, without ultrasonic tip shaft interference from an implant crown during grinding.

Applicant provides an important ultrasonic tip narrow wire shaft body configuration of the individual straight tip shaft body three segments, 12a, 12b, and 12c, having specific bend angles between adjacent shaft body segments, that is also critical for accessing the jawbone defect and applying the tapered grinder plate 14 parallel to the implant base curved surface, due to the crown size and location above the exposed implant diseased surface. The specific angles required in the ultrasonic instrument shaft tip linear segments are discussed below. In FIGS. 1A and 1B, the first ultrasonic tip shaft body segment 12a is essentially coaxial longitudinally with the ultrasonic instrument 16 and straight. The second ultrasonic tip narrow wire shaft body segment 12b bends downwardly and outwardly at predetermined angles relative to the ultrasonic tip body segment 12a longitudinal axis. The third ultrasonic tip shaft body segment 12c is at an angular bend relative to second segment 12b inwardly back toward first shaft segment 12a axis. At the distal most end of the ultrasonic tip shaft body is the tapered grinder plate 14 having its top back section directly connected to the distal end of the ultrasonic tip 12 at an important predetermined angle. The goal of a ultrasonic tip narrow wire shaft body segment angular arrangement and tapered grinder plate 14 distal end angle is to allow an operator to manually position the tapered grinder plate diamond-coated cylindrically concave surface vertically parallel to a vertical small segment of the cylindrical implant base contaminated surface to receive grinding, with up and down manual grinding movements, without interference with a crown on top of an implant base based on the operator's manual position of the ultrasonic instrument.

A tube 18 has an opening and supplies water during ultrasonic frequency grinding for cooling the grinder plate and surface being ground and is not part of the invention.

Referring now to FIG. 1B, ultrasonic instrument tip narrow wire shaft segments 12a, 12b, and 12c are shown having tapered grinder plate 14 affixed to the distal end of shaft 12c at the top 14b of the grinder plate 14, and at the back top portion 14d of grinder plate 14. The front surface 14a of tapered grinder plate 14 is preferably cylindrically concave but could be flat. One of the most important physical aspects of the tapered grinder plate 14 is that the thickness, from the top front and top back surfaces 14b to the bottom front to back surfaces at 14c, is tapered, and is thicker at the top 14b than at the bottom 14c. The grinder plate 14 taper is critical to allow sufficient grinder plate access within the jaw bone defect, formed from loss of jaw bone support by osseo-integration between the jaw bone and the exposed diseased implant base surface, to the exposed diseased implant surface defect for maximum surface contact of the grinder plate grinding diamond-coated surface with the implant base diseased surface for grinding because the grinder plate 14 must be positioned for flush, parallel, vertical contact on the implant cylindrical base contaminated surface inside the diseased jawbone defect. The jawbone defect is wedge-shaped and is extremely narrow at the bottom of the jawbone defect where the jawbone connects and contacts the implant base's connected surface. See FIG. 6. In one embodiment, the grinder plate top upper thickness of surface 14b (front to back) is 0.040 of an inch while at the bottom 14c the thickness (front to back) is 0.013 of an inch.

Figure 2:
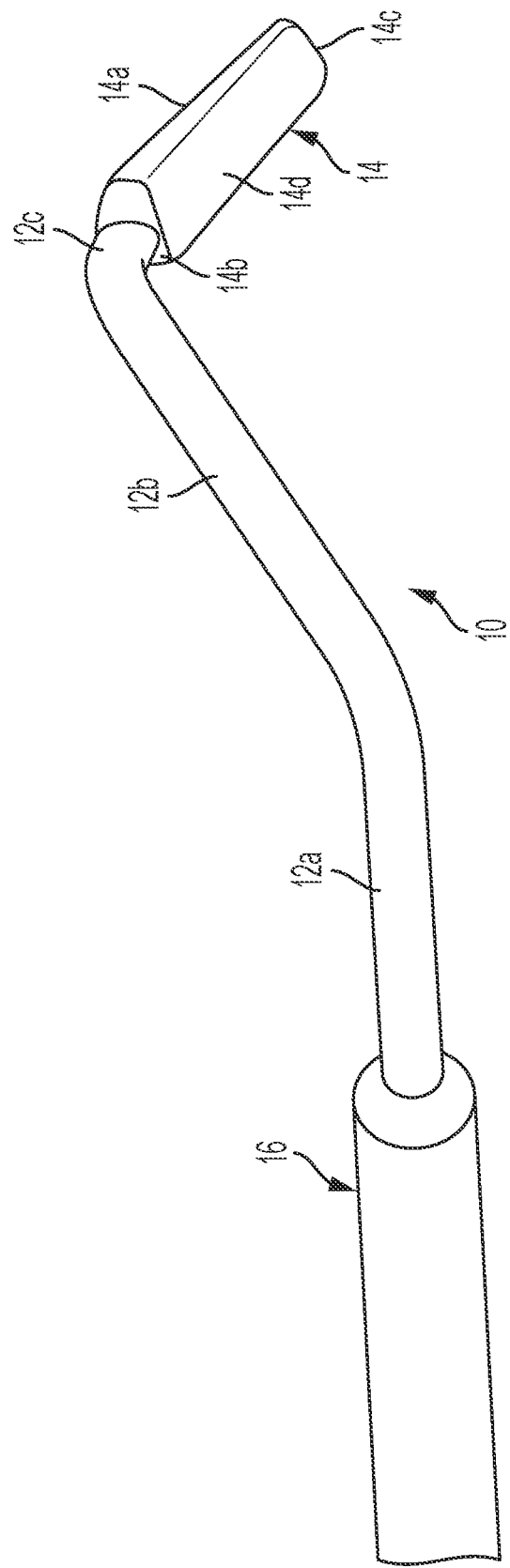
FIG. 2 shows a partial rear perspective view of the ultrasonic tip invention including a perspective view of the back surface of the tapered grinder plate and the ultrasonic tip narrow wire shaft and bends.

FIG. 2 shows the back tapered grinder plate surface 14d and the grinder plate 14 connection to ultrasonic instrument tip narrow wire shaft segment 12c. The grinder plate grinding surface 14a is not visible, but the tapered grinder plate is thicker at the top 14b, front to back, than the bottom 14c. The invention shown in FIGS. 1A, 1B, and 2 is very small in size, when manufactured and used, compared to the views in these figures. The grinder plate 14 vertical length in some embodiments is 6 mm. The approximate length of the ultrasonic tip 12 is in some embodiments a total of 25 mm.

The invention shown in FIGS. 1A, 1B, and 2 is actually utilized in the peri-implantitis treatment with two separate mirror-image devices, a first unit for use cheek side and a second mirror image unit for use on the tongue side, so that each grinder plate front concave diamond-coated surface can be manually positioned more easily relative to the diseased implant vertical, cylindrical surface to permit access 180 degrees around of the implant diseased surface, both cheek side and tongue side. Each mirror image ultrasonic instrument tip shaft and grinder plate can each be individually attached to the same ultrasonic instrument housing 16. By using two mirror-image devices, each termed either a cheek side or tongue side, an operator can conveniently and thoroughly grind a diseased cylindrically vertical implant base, when necessary, a total of 360-degrees around the cylindrical implant base diseased area for complete cleaning, 180-degrees cleaning cheek side and 180-degrees cleaning tongue side. The grinding process with a grinding plate 14 is explained in greater detail below for bacterial removal to ensure optimum osseo-integration. The configuration of the ultrasonic instrument tip shaft 12 and the angular displacements formed by bends in the three ultrasonic instrument tip shaft segments 12a, 12b, and 12c are also essential for the optimum manual positioning by an operator of the grinding plate 14 to avoid interference during the grinding operation from the crown attached to the diseased implant base and maintaining the grinder plate concave diamond-coated surface 14a parallel to the diseased implant base cylindrical surface during grinding.

Figure 3A:
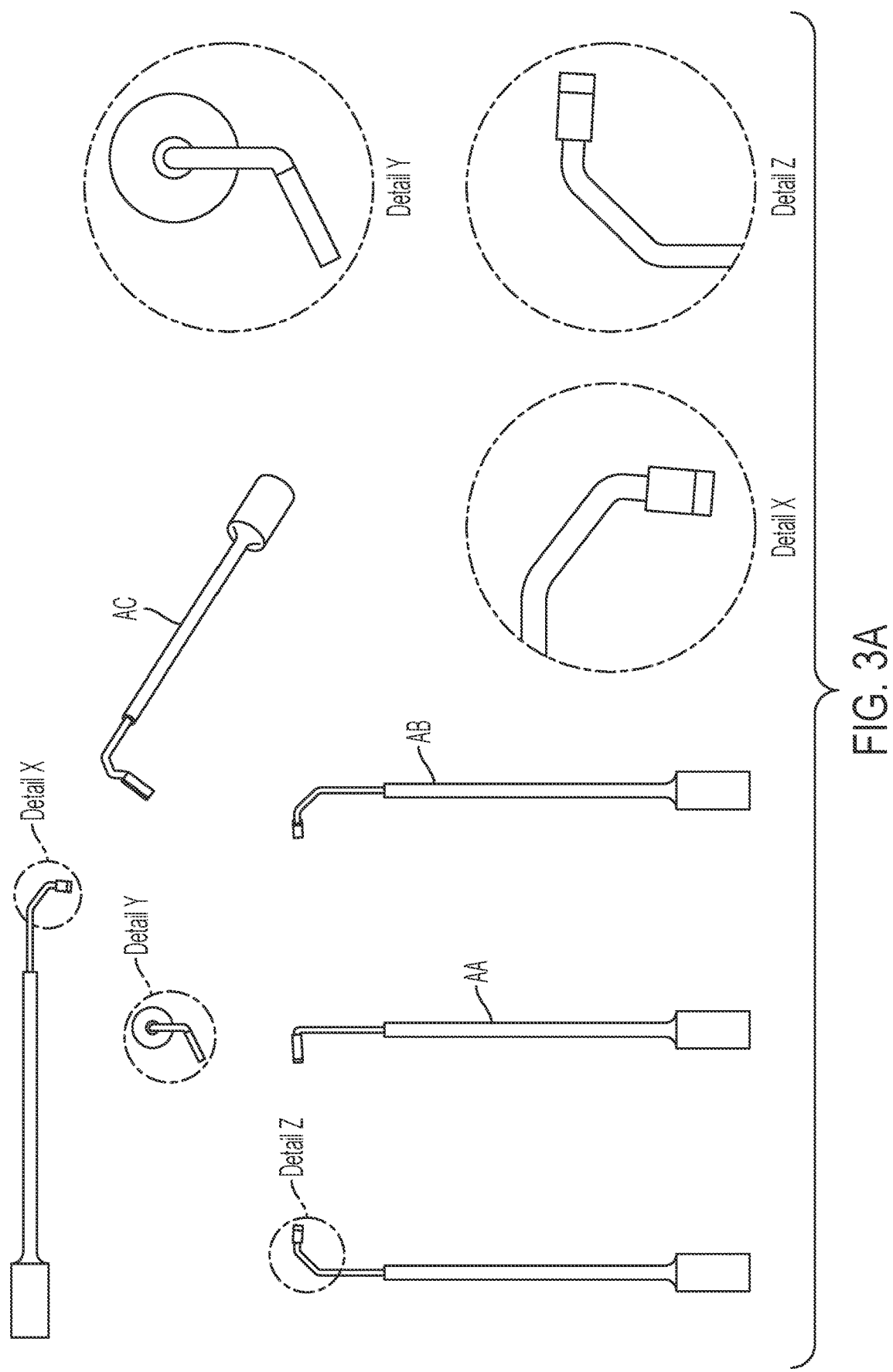
FIGS. 3A and 3B show two embodiments of the invention, namely first and second mirror images of the invention, in schematic diagrams to illustrate three detailed views of each of the first mirror image and three detailed views of the second mirror image of the invention representing geometric orientations of the ultrasonic tip narrow wire shaft body segments and bends and angles relative to the ultrasonic instrument and tip longitudinal axes referencing the two mirror images.
Figure 3B:
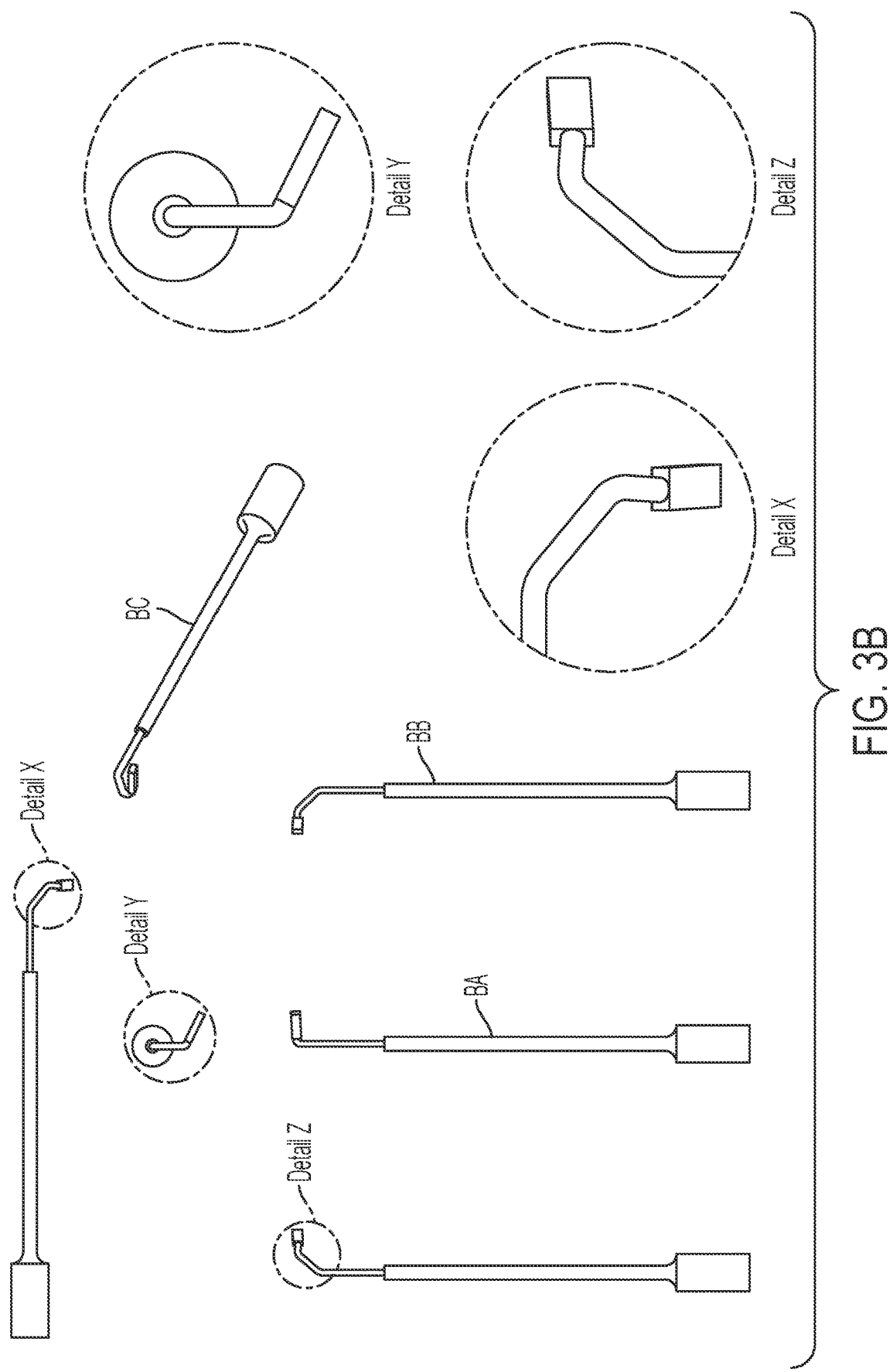

FIG. 3A and FIG. 3B show the invention, in two equivalent structures, two mirror images, respectively, termed a mirror image unit for cheek side and a mirror image unit for tongue side operator use, for manual use of the instrument, in the same operator hand, during grinding, in schematic geometrical illustrations to model cheek side and tongue side mirror images units, properly configured and shaped ultrasonic tip narrow wire shaft bodies, each having a tapered diamond-coated grinding plate at its distal end.

FIG. 3A shows several views of a tongue side mirror image schematic representation of an ultrasonic instrument tip shaft with three linear shaft segments and two bends, in three separate views, labeled Detail X; Detail Y; and Detail Z. The third bend determining the grinder plate end ultrasonic tip shaft angle is not represented for the mirror image discussions but is the same in both mirror images. FIG. 3A is one mirror image also showing different front, back and side views of the same mirror image unit views AA, AB, and AC. In Detail X, the tongue side mirror image shows the bottom of the grinder plate facing the viewer in a bottom view of the device. Detail Y shows a front elevational view into the longitudinal axis of the device. The grinder plate front surface faces downwardly. Detail Z is a side back elevational view of the device. Detail X is a side elevational view with the grinder plate pointing at the viewer. Detail Y is a front elevational view into the longitudinal axis of the instrument housing and tip with the grinder plate front face looking downward. Detail Z is an elevational view showing the grinder plate bottom surface pointing at the viewer. The first shaft segment could be angled about 40-degrees from its longitudinal axis, perpendicular downward relative to the second linear shaft segment. The second shaft segment has its longitudinal axis angled about 55-degrees relative to a linear third shaft segment. Detail Z is the back surface of the grinder plate facing horizontal into the page at what represents what could be the location of a grinder plate at the distal end of shaft. Although different angular bends could be determined between the first, second and third segments, the goal is to create a fixed relationship geometrically between the end and planer axis of the first segment and the distance and plane of the grinder plate front surface 14a to avoid interference with the crown above the diseased implant base when grinding.

FIG. 3B shows the cheek side mirror image of the invention. There is an angle between the longitudinal axis of the ultrasonic tip narrow wire shaft first segment and second segment ultrasonic tip narrow wire shaft and an angle with the third segment ultrasonic tip narrow wire shaft while the grinder plate front grinding surface is somewhat parallel to the longitudinal axis vertical plane of the first segment, but the ultrasonic tip narrow wire shaft arrangement, a mirror image, that changes into a mirror image beginning at the end area of the ultrasonic tip narrow wire shaft first segment in a mirror image, to corresponding ultrasonic tip narrow wire shaft angles up to the grinder plate, between left and right shaft tip directions. In FIG. 3B, Detail X, Detail Y, and Detail Z are mirror image views including view BA, view BB, and view BC of the invention, as similarly described in FIG. 3A. For example in Detail X, the grinder plate is pointing in the opposite direction, even though the front grinder surface points down in the same direction. Detail Y also shows the grinder plate pointing to the right side while the front grinder plate surface also faces downward as in FIG. 3A.

One purpose of this important arrangement and orientation of three separate ultrasonic instrument tip shaft segments, each bent relative to the longitudinal axis of each of the three shaft segments, to a specific location, is to provide a specific positional relationship between the ultrasonic instrument hand-held housing and a tapered grinder plate diamond-covered front surface is to ensure that when the ultrasonic instrument is manually positioned by an operator for flush parallel engagement between the grinder plate concave diamond-coated surface and the diseased implant base vertical cylindrical surface for grinding, the implant crown does not physically interfere with the operator's grinding operation or with the grinder plate surface. Again the invention is provided for treatment in mirror image pairs, a tongue side unit and a cheek side unit ultrasonic instrument tip shaft and grinder plate, which guarantee manual grinding access to the implant base diseased surface by an operator, 180-degrees for each grinding plate mirror image, cheek side and tongue side, resulting in 360-degrees of grinding on the diseased implant base surface if necessary to remove contaminated surface area, all the way around the exposed cylindrical implant base surface.

Figure 4:
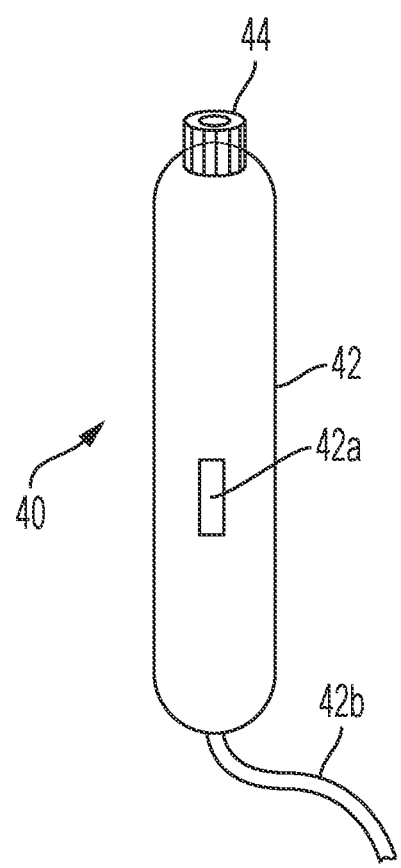
FIG. 4 shows a front perspective view of a conventional ultrasonic handheld instrument that provides ultrasonic energy and may connect to an ultrasonic tip shown in FIGS. 1A, 1B, and 2.

FIG. 4 shows an example of a handheld ultrasonic instrument 40 that includes a housing 42 that contains an ultrasonic frequency transducer for producing ultrasonic vibrations that are ultimately transferred to the ultrasonic tip devices shown in FIGS. 1A, 1B, and 2. An ultrasonic tip is attached physically to instrument connector 44 that allows for the transfer of the ultrasonic vibrations from the transducer inside housing 42 to an ultrasonic tip attached to tip connector 44. An instrument on-off switch is shown at 42a. An electrical cord 42b provides electrical energy to the ultrasonic instrument 40. As provided for in this invention, the ultrasonic instrument 40 is conventional and can provide a large range of different ultrasonic vibrational frequencies as required. It can be powered by a piezoelectric transducer or a magneto-restrictive transducer.

Figure 5A:
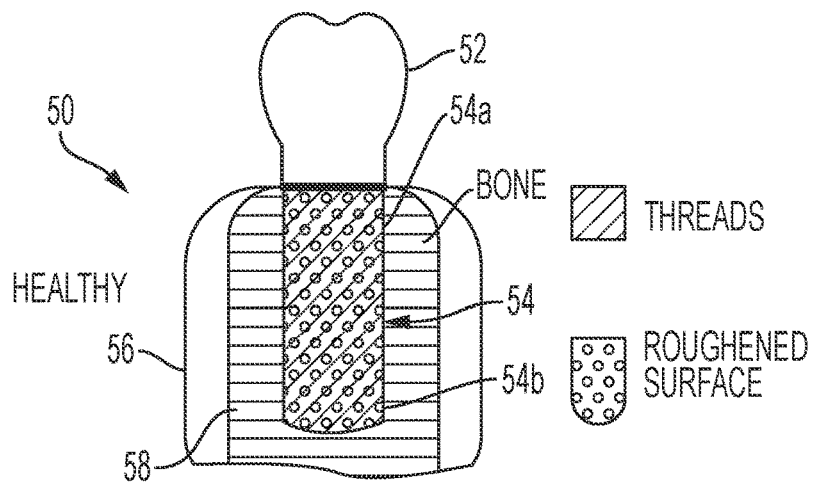
FIG. 5A shows a schematic diagram of a dental implant with a crown and metal base and metal base threads that are healthy and do not have peri-implantitis.
Figure 5B:
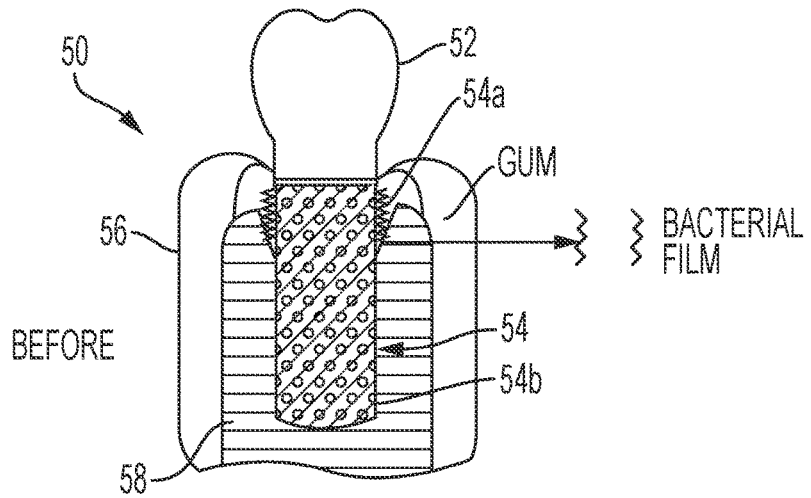
FIG. 5B shows a schematic diagram of a dental implant with a crown and metal base with threads that exemplify peri-implantitis on an upper portion of the implant metal base before treatment.
Figure 5C:
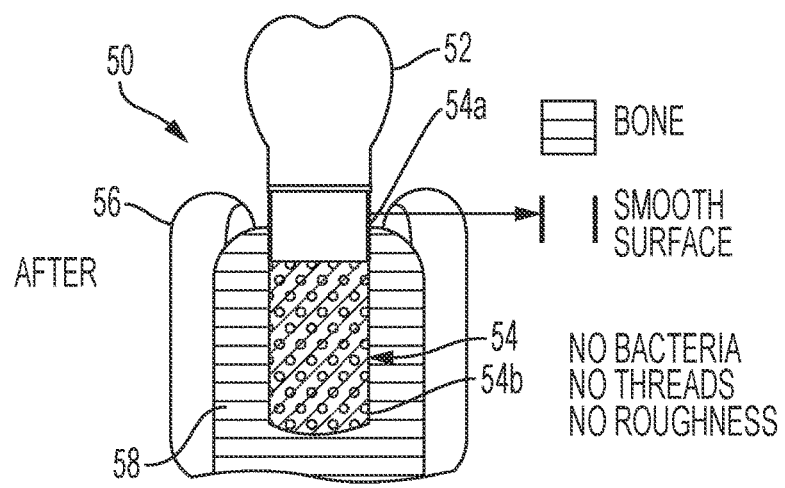
FIG. 5C shows a schematic diagram of the dental implant shown in FIG. 5B after treatment with the present invention.

Referring now to FIG. 5A, FIG. 5B and FIG. 5C, a dental implant 50 is shown as healthy in FIG. 5A; dental implant 50 diseased portion 54a in FIG. 5B (before treatment); and dental implant 50 disease free, smooth portion 54a in FIG. 5C (after treatment), the refreshed roughened surface (including diseased threads) with bacterial biofilm surface removed, provided by the present invention.

In FIG. 5B, the dental implant 50 is shown in a jawbone 58 surrounded by gum tissue 56. The implant 50 has a crown 52 that originally is attached to the metal dental implant base 54. The implant metal base 54 has an exposed diseased surface area 54a that is roughened and threaded (represented shown by small circles and oblique lines) and an unexposed surface area 54b that is not diseased and is safely attached to the jawbone 58.

The method of the invention allow a trained operator, such as a periodontist, that provides treatment for peri-implantitis in accordance with this invention using ultrasonic tips such as embodiments shown in FIGS. 1A, 1B, and 2 by grinding a thin layer of the metal implant surface 54a shown in FIG. 5B until such thin surface is removed, as shown in FIG. 5C. The smooth metal implant surface 54a has had the contaminated roughened surface removed by grinding in accordance with the present invention. As shown in FIG. 5C, the smooth surface 54a of the metal implant has also had screw thread tips removed, which were also contaminated with disease-causing bacterial biofilms. The refreshed clean surface 54a (represented by a pair of vertical straight black lines) in FIG. 5C is now ready for re-osseo-integration procedures.

FIG. 6 shows a schematic diagram of an implant base 60 (without the attached crown) as it would be anchored in human tissue and jawbone 62 that has bone loss separation forming a wedge-shaped cavity defect 64 exposing the upper surface of the implant base 60, while part of the implant base surface is shown attached to bone tissue 62, below defect 64. Also shown, for illustration purposes is a grinder plate 66 that is tapered in parallel contact with a portion of the surface of the implant base 60. In the method of the invention, a trained operator grasps the ultrasonic instrument housing with a thumb and fingers to position the tapered grinder plate 66 (also referenced as 14 in FIGS. 1A, 1B, and 2), manually held parallel to implant base 60 and generally vertically disposed relative thereto, and the grinder plate is moved and positioned to contact, in parallel, the lowest exposed area of the contaminated implant base at the bottom of the diseased jawbone defect 64, because of its tapered thickness, allowing maximum grinder surface parallel contact for the diseased implant 60, partially anchored in jawbone 68 and tissue 62. Also assisting in the cleaning of the implant, a detoxicant liquid 70 is shown disposed in the jawbone defect 64 area that will be activated by the ultrasonic vibrations of the grinder plate 66 for additional cleaning action by getting into the implant base 60 roughened microstructure surface to get rid of bacterial biofilms elements in the microstructure, especially at the very cavity defect 64 bottom where the jawbone is beginning to separate from the diseased implant base 60. The vibration of the grinder plate 66 being positioned within a moat or defect 64 and surrounded by detoxicant liquid 70 can greatly enhance the cleaning of the implant roughened microstructure when the grinder plate 66 vibrates the liquid 70 wherever the liquid 70 is introduced and resides in a defect 64.

FIG. 7 is a drawing that is based on an actual photograph of a diseased implant base in the center implant (between two other teeth) with a jawbone loss defect exposing the implant base. FIG. 7 illustrates how difficult accessing the lower exposed base portion of the implant base surface is for grinding in a jawbone loss defect cavity with a grinder plate.

Therefore, a variety of precise tapered sizes and shapes of the diamond-coated grinder plates and various concave or other curvature grinding diamond-coated surfaces can be utilized in the present invention to achieve the best grinding results.

The diamond-coated materials that are used on the grinder plates in accordance with the present invention are abrasive to metals such as titanium alloys used to manufacture implants. When an ultrasonically vibrated grinder plate is pressed against a titanium alloy implant roughened, diseased surface, the diamond-coated material causes removal of a thin layer of implant surface roughened and diseased material.

The complete disclosure of the reference cited in the specification is hereby incorporated by reference including U.S. Patent Application Publication 2016/0081764. The invention has been described herein with reference to presently preferred embodiments of the method and device. None of the descriptions set forth herein are intended to limit the scope of the invention. It is expected that persons of skill in the art will recognize numerous alternatives, additions and modifications which may be applied to the best specific embodiments described herein. It is intended that all such alternatives, additions or modifications shall be included within the scope of the present invention as defined by the following claims and equivalents thereof.

What I claim is:

1. A dental appliance ultrasonic tip for treating peri-implantitis, by removing a thin layer of a diseased, implant base surface, that can be operationally attached to a hand-held ultrasonic frequency generator instrument to create ultrasonic vibrations on said ultrasonic tip comprising:

an ultrasonic tip narrow wire shaft body having a proximal end and a distal end, said proximal end including an ultrasonic frequency generator instrument connector for attaching said ultrasonic tip narrow wire shaft body to the ultrasonic frequency generator instrument for transmission of ultrasonic frequency vibrations to said ultrasonic tip;

a tapered grinder plate having a plate body connected to said narrow wire shaft body distal end, said tapered grinder plate body having a length of approximately 6 mm for positional access within a jaw bone defect and for manual positioning said tapered grinder plate flush against an implant base for contacting the implant base along a vertical surface of the implant base, said tapered grinder plate body having parallel vertical sides, a top end and a bottom end, a front grinding surface and a back surface, said tapered grinder plate front grinding surface including a diamond coating that is abrasive for grinding metal to remove a thin layer of said implant base surface, and the tapered grinder plate body top end between the tapered grinder plate front grinding surface and said tapered grinder plate body back surface being greater in distance from the front grinding plate surface to said tapered grinder plate body back surface than said tapered grinder plate body bottom end distance between the front grinder plate surface and said back surface, said tapered grinder plate body having a vertical taper from said top end to said bottom end between the tapered grinder plate front grinding surface and said back surface;

said ultrasonic tip narrow wire shaft body having a length of approximately 25 mm, having a first shaft linear segment, a second shaft linear segment connected to said first shaft linear segment by a first bend, and a third shaft linear segment, said third shaft linear segment connected to said second shaft linear segment by a second bend, said tapered grinder plate front grinding surface disposed facing outwardly and below the narrow wire shaft body first shaft linear segment, providing ergonomically enhanced manual positioning of the tapered diamond-coated grinder plate.

2. The dental appliance ultrasonic tip as in claim 1, wherein:

said tapered grinder plate is substantially rectangular in shape and said tapered grinder plate front grinder surface is concave.

3. The dental appliance ultrasonic tip as in claim 1, wherein:

wherein the first bend is a 40 degree bend between the first shaft linear segment and said second shaft linear segment, and said second bend between the third shaft linear segment and said second shaft linear segment is a 55 degree angle; said third shaft linear segment and said grinder plate are bent at a 65 degree angle relative to each other, wherein said tapered grinder plate front grinding surface ef is substantially parallel to the longitudinal axis vertical plane of said ultrasonic tip narrow wire shaft first linear segment.

\* \* \* \* \*